(12) United States Patent
Hsieh et al.

(10) Patent No.: US 12,345,969 B2
(45) Date of Patent: Jul. 1, 2025

(54) ELECTRONIC DEVICE COMPRISING A PLURALITY OF MICRO LENSES SWITCHABLE BETWEEN A PRIVACY MODE AND A SHARE MODE

(71) Applicant: Innolux Corporation, Miaoli County (TW)

(72) Inventors: Hong-Sheng Hsieh, Miaoli County (TW); Chia-Hsien Hsieh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/964,021

(22) Filed: Oct. 11, 2022

(65) Prior Publication Data

US 2023/0168526 A1    Jun. 1, 2023

(30) Foreign Application Priority Data

Nov. 30, 2021    (CN) .......................... 202111443316.4

(51) Int. Cl.
  *G02F 1/13*  (2006.01)
  *G02F 1/1335*  (2006.01)
(52) U.S. Cl.
  CPC ...... *G02F 1/1323* (2013.01); *G02F 1/133607* (2021.01)
(58) Field of Classification Search
  None
  See application file for complete search history.

(56) References Cited

U.S. PATENT DOCUMENTS

| | | | |
|---|---|---|---|
| 10,725,228 B2 | 7/2020 | Choi et al. | |
| 2010/0231830 A1* | 9/2010 | Hirakata | G02B 5/0242 349/96 |
| 2014/0168574 A1* | 6/2014 | Matsubara | G02B 6/0088 349/62 |
| 2020/0064687 A1* | 2/2020 | Imada | G02F 1/133504 |
| 2020/0319512 A1* | 10/2020 | Murzyn | B60K 35/00 |

FOREIGN PATENT DOCUMENTS

| | | | | |
|---|---|---|---|---|
| CN | 113767307 A | * | 12/2021 | ........... G02B 3/0037 |
| JP | 2019086560 A | * | 6/2019 | ............ B60K 35/00 |
| TW | 201224515 | | 6/2012 | |
| WO | WO-2011162024 A1 | * | 12/2011 | ............. G02B 6/005 |

OTHER PUBLICATIONS

"Office Action of Taiwan Counterpart Application", issued on Mar. 24, 2023, p. 1-p. 5.

* cited by examiner

*Primary Examiner* — Paul C Lee
(74) *Attorney, Agent, or Firm* — JCIPRNET (57) ABSTRACT

An electronic device, including a substrate, multiple light emitting elements, an optical switching unit, and multiple micro lenses, is provided. The light emitting elements are disposed on the substrate. The optical switching unit is disposed on the light emitting elements. The micro lenses are disposed on the light emitting elements and overlap with the optical switching unit. At least one of the light emitting elements is disposed corresponding to one of the micro lenses.

19 Claims, 10 Drawing Sheets

ELECTRONIC DEVICE COMPRISING A PLURALITY OF MICRO LENSES SWITCHABLE BETWEEN A PRIVACY MODE AND A SHARE MODE

CROSS-REFERENCE TO RELATED APPLICATION

This application claims the priority benefit of China application serial no. 202111443316.4, filed on Nov. 30, 2021. The entirety of the above-mentioned patent application is hereby incorporated by reference herein and made a part of this specification.

BACKGROUND

Technical Field

The disclosure relates to an electronic device.

Description of Related Art

An electronic device having a display function is expected to have a wide viewing angle in general usage conditions. However, when it comes to privacy or confidentiality, the electronic device is expected to have a privacy protection effect. Therefore, how to provide an electronic device capable of switching display modes according to different usage conditions has become one of the topics for relevant research and development personnel.

SUMMARY

The disclosure provides an electronic device having a share mode and a privacy mode.

According to an embodiment of the disclosure, an electronic device includes a substrate, multiple light emitting elements, an optical switching unit, and multiple micro lenses. The light emitting elements are disposed on the substrate. The optical switching unit is disposed on multiple the light emitting elements. The micro lenses are disposed on the light emitting elements and overlap with the optical switching unit. At least one of the light emitting elements is disposed corresponding to one of the micro lenses.

In order for the features and advantages of the disclosure to be more comprehensible, the following specific embodiments are described in detail in conjunction with the drawings.

BRIEF DESCRIPTION OF THE DRAWINGS

The drawings are included to provide a further understanding of the disclosure, and the drawings are incorporated into the specification and constitute a part of the specification. The drawings illustrate embodiments of the disclosure and serve to explain principles of the disclosure together with the description.

DETAILED DESCRIPTION OF DISCLOSED EMBODIMENTS

Reference will now be made in detail to the exemplary embodiments of the disclosure, examples of which are illustrated in the drawings. Wherever possible, the same reference numerals are used in the drawings and description to refer to the same or similar parts.

Throughout the specification and the appended claims of the disclosure, certain terms are used to refer to specific elements. It should be understood by persons skilled in the art that electronic device manufacturers may refer to the same element by different names. The disclosure does not intend to distinguish between elements with the same function but different names. In the following specification and claims, words such as "containing" and "comprising" are open-ended words, so the words should be interpreted as "including but not limited to . . . ".

Directional terms, such as "upper", "lower", "front", "rear", "left", and "right", mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

When a structure (or layer, element, substrate) is described in the disclosure as being located on/above another structure (or layer, element, substrate), it may mean that the two structures are adjacent and directly connected or it may mean that the two structures are adjacent but not directly connected. Indirect connection means that there is at least one intermediate structure (or intermediate layer, intermediate element, intermediate substrate, intermediate interval) between the two structures. The lower surface of one structure is adjacent to or directly connected to the upper surface of the intermediate structure, and the upper surface of the other structure is adjacent to or directly connected to the lower surface of the intermediate structure. The intermediate structure may be composed of a single-layer or multi-layer physical structure or non-physical structure, which is not limited. In the disclosure, when a certain structure is disposed "on" another structure, it may mean that the certain structure is "directly" on another structure or it may mean that the certain structure is "indirectly" on another structure, that is, at least one structure is also sandwiched between the certain structure and another structure.

Terms such as "first" and "second" used in the specification and the claims are used to modify elements, and the terms do not imply and represent that the element(s) have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terms, whereby a first component in the specification may be a second component in the claims.

Electrical connection or coupling described in the disclosure may refer to direct connection or indirect connection. In the case of direct connection, terminals of elements on two circuits are directly connected or connected to each other by a conductor segment. In the case of indirect connection, there is a switch, a diode, a capacitor, an inductor, a resistor, other suitable elements, or a combination of the above elements between the terminals of the elements on the two circuits, but not limited thereto.

In the disclosure, the measurement manner of thickness, length, and width may adopt an optical microscope, and the thickness or the width may be measured by a cross-sectional image in an electron microscope, but not limited thereto. In addition, there may be a certain error in any two values or directions used for comparison. Additionally, the terms "approximately", "substantially", or "roughly" mentioned in the disclosure generally mean within 10% of a given value or range. Furthermore, the phrases "the given range is from a first value to a second value" and "the given range falls within the range of the first value to the second value" mean that the given range includes the first value, the second value, and other values in between. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

It should be noted that in the following embodiments, the features of several different embodiments may be replaced, recombined, and mixed to complete other embodiments without departing from the spirit of the disclosure. As long as the features of the embodiments do not violate the spirit of the invention or conflict with each other, the features may be arbitrarily mixed and matched.

Unless otherwise defined, all terms (including technical and scientific terms) used herein have the same meaning as commonly understood by persons skilled in the art to which the disclosure belongs. It can be understood that the terms, such as the terms defined in commonly used dictionaries, should be interpreted as having meanings consistent with the relevant art and the background or the context of the disclosure, and should not be interpreted in an idealized or overly formal manner, unless otherwise defined in the embodiments of the disclosure.

In the disclosure, an electronic device may include a display device, a backlight device, a sensing device, or a splicing device, but not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light rays, heat energy, or ultrasonic waves, but not limited thereto. In the disclosure, the electronic device may include an electronic element, wherein the electronic element may include a passive element and an active element, such as a capacitor, a resistor, an inductor, a diode, and a transistor. The diode may include a light emitting diode or a photo diode. The light emitting diode may include, for example, an organic light emitting diode (OLED), a mini LED, a micro LED, or a quantum dot LED, but not limited thereto. The splicing device may be, for example, a display splicing device or an antenna splicing device, but not limited thereto. It should be noted that the electronic device may be any combination of the above, but not limited thereto. Hereinafter, the disclosure will be described with the display device as the electronic device or the splicing device, but the disclosure is not limited thereto.

Figure 1A:
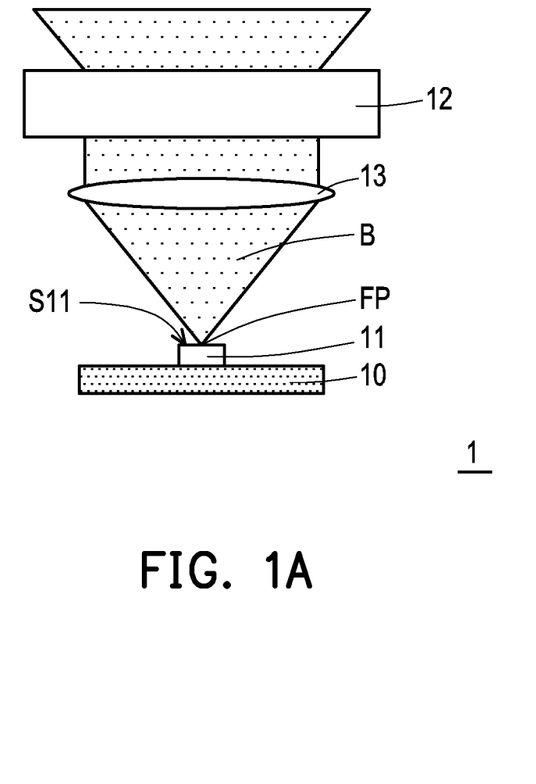
FIG. 1A and FIG. 1B are respectively partial cross-sectional schematic views of an electronic device in a share mode and a privacy mode according to some embodiments of the disclosure.
Figure 1B:
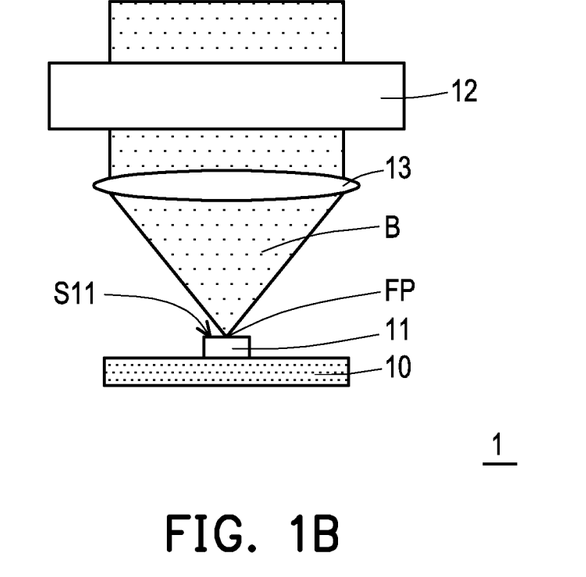

FIG. 1A and FIG. 1B are respectively partial cross-sectional schematic views of an electronic device in a share mode and a privacy mode according to some embodiments of the disclosure. Please refer to FIG. 1A and FIG. 1B. An electronic device 1 may include a substrate 10, multiple light emitting elements 11 (only one is schematically shown in the drawings), an optical switching unit 12, and multiple micro lenses 13 (only one is schematically shown in the drawings). The light emitting elements 11 are disposed on the substrate 10. The optical switching unit 12 is disposed on the light emitting elements 11. The micro lenses 13 are disposed on the light emitting elements 11 and overlap with the optical switching unit 12 in a first direction (not shown). At least one of the light emitting elements 11 is disposed corresponding to one of the micro lenses 13.

In detail, the substrate 10 may be used to carry the light emitting elements 11, and the light emitting elements 11 may be electrically connected to an external circuit (not shown) through the substrate 10. For example, the substrate 10 may include a circuit board having a glass substrate with wiring formed thereon or a plastic substrate with wiring formed thereon, but not limited thereto. The circuit board may include a printed circuit board and a flexible printed circuit board, but not limited thereto.

It should be noted that in the embodiment, the first direction may be roughly parallel to a normal direction of a surface of the substrate 10. The term "corresponding" in the specification may be defined as at least partially overlapping along a direction, but not limited thereto. For example, at least one of the light emitting elements 11 is disposed corresponding to one of the micro lenses 13, which may be interpreted as at least one of the light emitting elements 11 partially overlapping with one of the micro lenses 13 along the first direction.

The light emitting elements 11 may be disposed on the substrate 10 through die bonding, wire bonding, flip-chip packaging technology, or a combination of the above, but not limited thereto. In some embodiments, the light emitting elements 11 may be arranged into an array on the substrate 10 to provide a surface light source. For example, the light emitting element 11 may include an organic light emitting diode (OLED), a micro LED, a mini LED, or a quantum dot LED (abbreviated as QLED or QD-LED), but not limited thereto.

In some embodiments, the light emitting element 11 may be used as a single pixel of the display device, and each pixel is matched with one micro lens 13. For example, although not shown, the light emitting elements 11 may include multiple red light emitting elements, multiple green light emitting elements, and multiple blue light emitting elements, and one red light emitting element, one green light emitting element, and one blue light emitting element may constitute a single pixel. One micro lens 13 may be disposed corresponding to one red light emitting element, one green light emitting element, and one blue light emitting element. Alternatively, one micro lens 13 may be disposed corresponding to one red light emitting element, one green light emitting element, or one blue light emitting element. Furthermore, one micro lens 13 may be disposed corresponding to multiple light emitting elements with the same color, so as to maintain the required frontal brightness in the share mode. Under the architecture that one micro lens 13 is disposed corresponding to multiple light emitting elements (with the same color or different colors), the light emitting elements may be concentrated or dispersed.

The optical switching unit 12 and the micro lenses 13 are all disposed on the light emitting elements 11. In some embodiments, the micro lenses 13 may be between the optical switching unit 12 and the light emitting elements 11, but not limited thereto. In other embodiments, the optical switching unit 12 may be between the light emitting elements 11 and the micro lenses 13.

The micro lenses 13 and the light emitting elements 11 may have a one-to-one configurational relationship, but not limited thereto. In other embodiments, the micro lenses 13 and the light emitting elements 11 may have a one-to-many configurational relationship.

Each micro lens 13 may be used to converge light beams or to collimate light beams. For example, the micro lens 13 may be a convex lens, such as a plano-convex lens or a biconvex lens, but not limited thereto. In other embodiments, the micro lens 13 may be a bilayer lens.

In some embodiments, a light emitting surface S11 of the light emitting element 11 may be disposed on a focal point FP of the micro lens 13 or disposed adjacent to the focal point FP of the micro lens 13, so that a light beam B emitted from the light emitting surface S11 of the light emitting element 11 may be changed from a divergent light to a parallel light or a nearly parallel light via the micro lens 13.

The optical switching unit 12 may be switched between a transparent state and a haze state. When the electronic device 1 is in the share mode, as shown in FIG. 1A, the optical switching unit 12 may be switched to the haze state, so that the light beam B from the micro lens 13 may be changed from the parallel light to the divergent light via the optical switching unit 12. When the electronic device 1 is in the privacy mode, as shown in FIG. 1B, the optical switching unit 12 may be switched to the transparent state, so that the light beam B from the micro lens 13 may be the parallel light or a collimated light after passing through the optical switching unit 12.

In some embodiments, the optical switching unit 12 may be an electronically controlled optical switching element. For example, although not shown, the optical switching unit 12 may include two substrates and a liquid crystal layer disposed between the two substrates. The two substrates may include light transmitting substrates, and the two substrates may be soft substrates or hard substrates. For example, the two substrates may include glass substrates, plastic substrates, or combinations of the above, but not limited thereto. The liquid crystal layer may include polymer dispersed liquid crystal (PDLC), polymer network liquid crystal (PNLC), or polymer stabilized cholesteric texture (PSCT), but not limited thereto.

Under the architecture in which the liquid crystal layer adopts polymer dispersed liquid crystal, the optical switching unit 12 may further include two light transmitting conductive layers (not shown), wherein the two light transmitting conductive layers may be entire electrode layers, the two light transmitting conductive layers are disposed between the two substrates, and the liquid crystal layer is disposed between the two light transmitting conductive layers. In other words, the two light transmitting conductive layers are respectively disposed on opposite sides of the liquid crystal layer. The material of the light transmitting conductive layer may include metal oxide, such as indium tin oxide (ITO), but not limited thereto.

Under the architecture in which the liquid crystal layer adopts polymer dispersed liquid crystal, the optical switching unit 12 may be switched to the transparent state by having a voltage difference between the two light transmitting conductive layers. On the other hand, the optical switching unit 12 may be switched to the haze state by having no voltage difference between two patterned light transmitting conductive layers.

Under the architecture in which the liquid crystal layer adopts polymer network liquid crystal, the optical switching unit 12 may further include a patterned light transmitting conductive layer (not shown), wherein the patterned light transmitting conductive layer may be disposed on one of the two substrates. The material of the patterned light transmitting conductive layer may include metal oxide, such as indium tin oxide, but not limited thereto. In some embodiments, the patterned light transmitting conductive layer may include multiple strip electrodes (not shown) arranged at intervals in a direction, but not limited thereto.

Under the architecture in which the liquid crystal layer adopts polymer network liquid crystal, the optical switching unit 12 may be switched to the haze state by having a voltage difference between the two adjacent strip electrodes. On the other hand, the optical switching unit 12 may be switched to the transparent state by having no voltage difference between the two adjacent strip electrodes.

Under the architecture in which the liquid crystal layer adopts polymer stabilized cholesteric texture, the optical switching unit 12 may further include two light transmitting conductive layers (not shown), wherein the two light transmitting conductive layers may be entire electrode layers, the two light transmitting conductive layers are disposed between the two substrates, and the liquid crystal layer is disposed between the two light transmitting conductive layers. In other words, the two light transmitting conductive layers are respectively disposed on opposite sides of the liquid crystal layer. The material of the light transmitting conductive layer may be referred to the above and will not be repeated.

Under the architecture in which the liquid crystal layer adopts polymer stabilized cholesteric texture, the optical switching unit 12 may be switched to the transparent state or the haze state by changing a voltage applied to the two light transmitting conductive layers at a specific frequency.

As shown in the embodiment of the electronic device 1, the light beam B from the light emitting element 11 is collimated through the micro lens 13, and the display mode of the electronic device 1 may be then controlled through switching the state of the optical switching unit 12. For example, when the electronic device 1 is switched to the share mode, a light beam output from the optical switching unit 12 may be more divergent through switching the optical switching unit 12 to the haze state, so that a viewer viewing the electronic device 1 at a large viewing angle can also see an image. On the other hand, when the electronic device 1 is switched to the privacy mode, the light beam output from the optical switching unit 12 may be more collimated through switching the optical switching unit 12 to the transparent state, so that it is difficult for the viewer viewing the electronic device 1 at a large viewing angle to see an image, thereby achieving a privacy protection effect.

FIG. 2 to FIG. 11 are respectively partial cross-sectional schematic views of an electronic device according to other embodiments of the disclosure. Please refer to FIG. 2. In addition to the substrate 10, the light emitting elements 11, the optical switching unit 12, and the micro lenses 13, an electronic device 1A may further include an optical film 14, an optical film 15, and a display panel 16.

Figure 2:
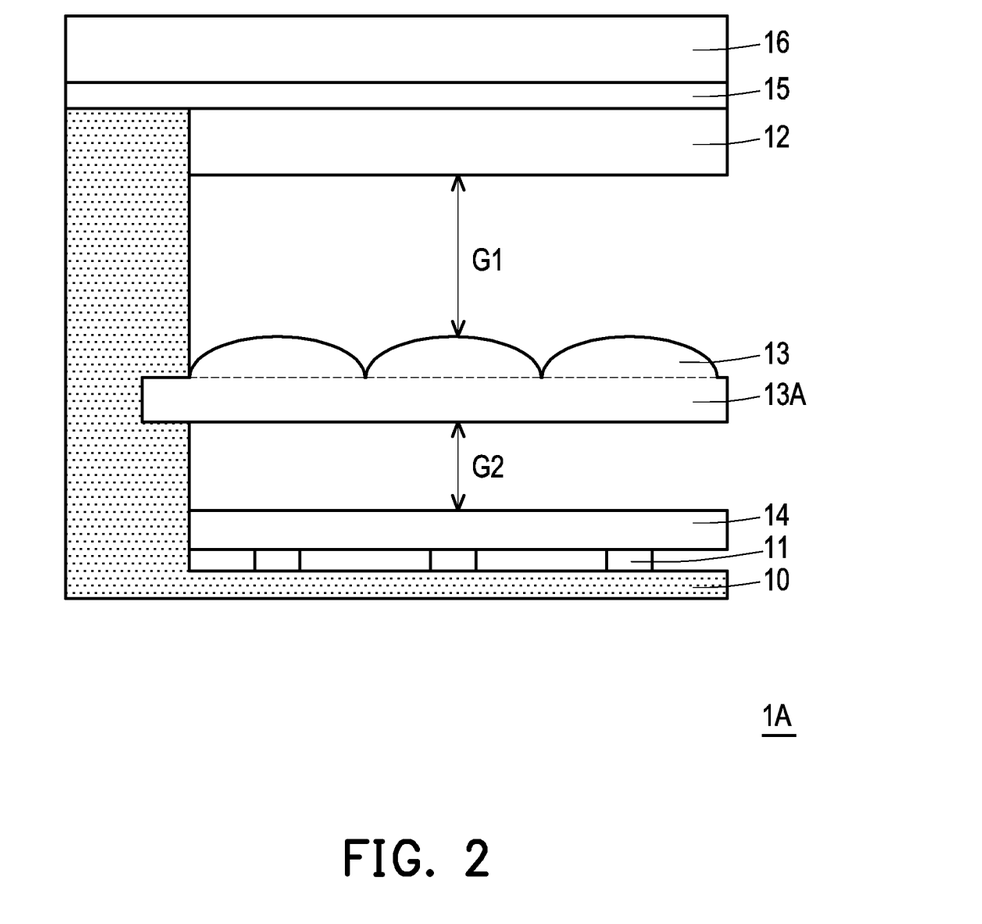
FIG. 2 to FIG. 11 are respectively partial cross-sectional schematic views of an electronic device according to other embodiments of the disclosure.

The optical film 14 is disposed on the light emitting elements 11 and is, for example, located between the micro lenses 13 and the light emitting elements 11. For example, the optical film 14 may be a dual brightness enhancement film (DBEF), a light wavelength conversion film, or a combination of the above, but not limited thereto. The light wavelength conversion film may convert a short wavelength light into a long wavelength light, for example, convert a blue light into a red light, a green light, or a combination of the above. For example, the material of the light wavelength conversion film may include fluorescence, phosphor, quantum dot (QD), other suitable materials, or a combination of the above, but not limited to. In some embodiments, the electronic device 1A may omit the dual brightness enhancement film or the light wavelength conversion film. In some embodiments, the positions of the dual brightness enhancement film and the optical switching unit 12 may be exchanged.

For example, when the light emitting element 11 is a white LED or OLED, the electronic device 1A may omit the light wavelength conversion film. When the light emitting element 11 is a blue LED, the electronic device 1A may include the dual brightness enhancement film and the light wavelength conversion film, and the light wavelength conversion film may be located between the dual brightness enhancement film and the light emitting element 11.

The optical film 15 is disposed on the light emitting elements 11 and is located, for example, between the display panel 16 and the optical switching unit 12. For example, the optical film 15 may include a low haze diffuser to reduce the visibility of dark fringes between the micro lenses 13. Low haze means that the haze is less than or equal to 70%. Alternatively, the optical film 15 may include a haze lower polarizer. Alternatively, the optical film 15 may include an adhesive member that fully bonds the display panel 16 and the optical switching unit 12 to increase rigidity.

The display panel 16 is disposed above the optical switching unit 12. The display panel 16 may be a non-self-luminous display panel, such as a liquid crystal display panel, but not limited thereto.

In some embodiments, as shown in FIG. 2, the micro lenses 13 may be plano-convex lenses, and the micro lenses 13 may be disposed on a substrate 13A. In some embodiments, the micro lenses 13 and the substrate 13A may be integrally formed, but not limited thereto. In some embodiments, convex surfaces of the micro lenses 13 face the optical switching unit 12, but not limited thereto. In other embodiments, the convex surfaces of the micro lenses 13 face the light emitting elements 11, and the optical switching unit 12 may be disposed between the micro lenses 13 and the optical film 14.

As shown in the embodiment of the electronic device 1A, an air gap between the micro lenses 13 and the optical film 15 is matched with a haze structure (for example, the low haze diffuser or the haze lower polarizer) located above the micro lenses 13 to reduce the visibility of micro lenses, particles, or defects in the electronic device 1A. In addition, there may be an air gap between the optical film 14 and the substrate 13A. In some embodiments, although not shown, a region between the optical film 14 and the substrate 13A may be filled with a light transmitting adhesive, such as an optically clear adhesive (OCA) or an optically clear resin (OCR) to fix the distances between the micro lenses 13 and the light emitting elements 11, but not limited thereto.

Figure 3:
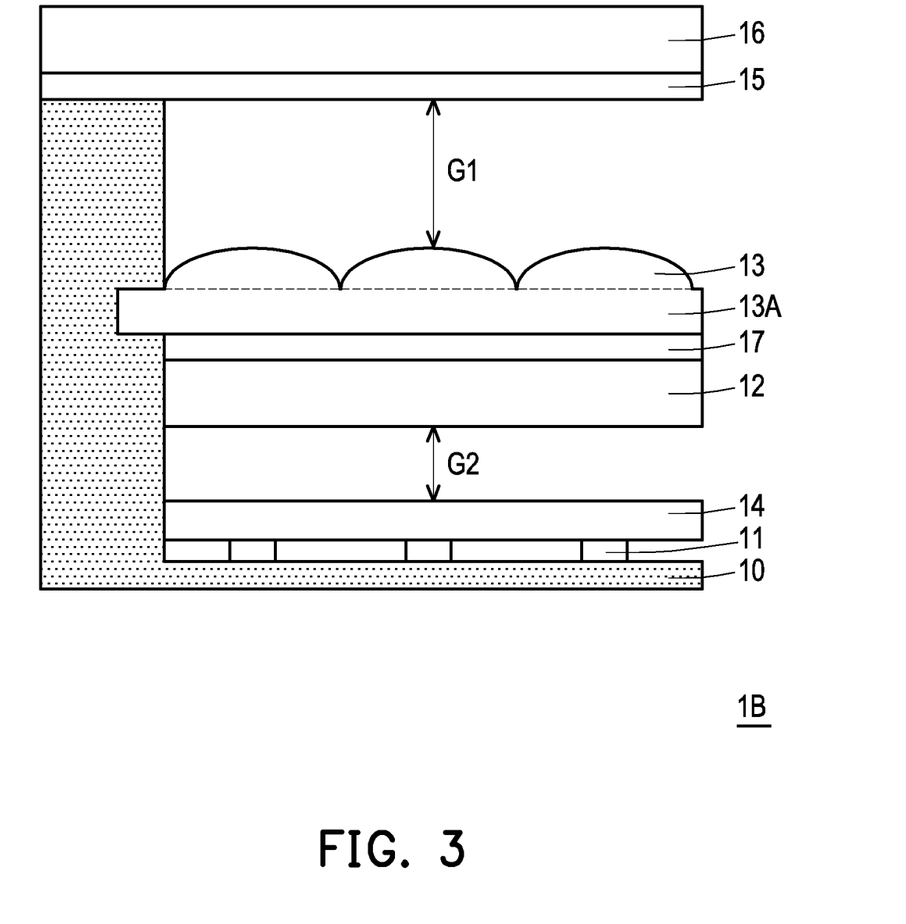

Please refer to FIG. 3. The main difference between an electronic device 1B and the electronic device 1A of FIG. 2 is described as follows. In the electronic device 1B, the optical switching unit 12 is between the light emitting elements 11 and the micro lenses 13. The electronic device 1B may further include an adhesive member 17, wherein the substrate 13A may be fully bonded to the optical switching unit 12 through the adhesive member 17 to increase rigidity.

In the electronic device 1B, the optical film 14 may be a dual brightness enhancement film, a light wavelength conversion film, or a combination of the above, but not limited thereto. In some embodiments, the electronic device 1B may omit the dual brightness enhancement film or the light wavelength conversion film. For example, when the light emitting element 11 is a white LED or OLED, the electronic device 1B may omit the light wavelength conversion film. When the light emitting element 11 is a blue LED, the electronic device 1B may include the dual brightness enhancement film and the light wavelength conversion film, and the light wavelength conversion film may be located between the dual brightness enhancement film and the light emitting element 11.

In the electronic device 1B, the optical film 15 may include a low haze diffuser or a haze lower polarizer. In addition, an air gap between the micro lenses 13 and the optical film 15 is matched with a haze structure (for example, the low haze diffuser or the haze lower polarizer) located above the micro lenses 13 to reduce the visibility of micro lenses, particles, or defects in the electronic device 1B. In addition, there is an air gap between the optical film 14 and the optical switching unit 12. In some embodiments, although not shown, a region between the optical film 14 and the optical switching unit 12 may be filled with a light transmitting adhesive, such as an optically clear adhesive or an optically clear resin to fix the distances between the micro lenses 13 and the light emitting elements 11, but not limited thereto.

It should be understood that although the above embodiments are exemplified with the light emitting elements 11 disposed under the micro lenses 13, the disclosure is not limited thereto. In other embodiments, although not shown, an electronic device may include a light guide plate, and the light emitting elements 11 may be disposed on the side of the light guide plate. A bottom surface of the light guide plate (for example, the surface of the light guide plate away from the optical switching unit 12) may be provided with multiple mesh dot structures or multiple microstructures to destroy total internal reflection, so that light transmitted inside the light guide plate is emitted from a top surface of the light guide plate (for example, the surface of the light guide plate facing the optical switching unit 12). In some embodiments, the mesh dot structures or the microstructures may be disposed corresponding to the micro lenses 13. For example, the mesh dot structures and the microstructures may be disposed one-to-one or many-to-one, so that the light is emitted out of the light guide plate from multiple regions overlapping with the micro lenses 13.

Figure 4:
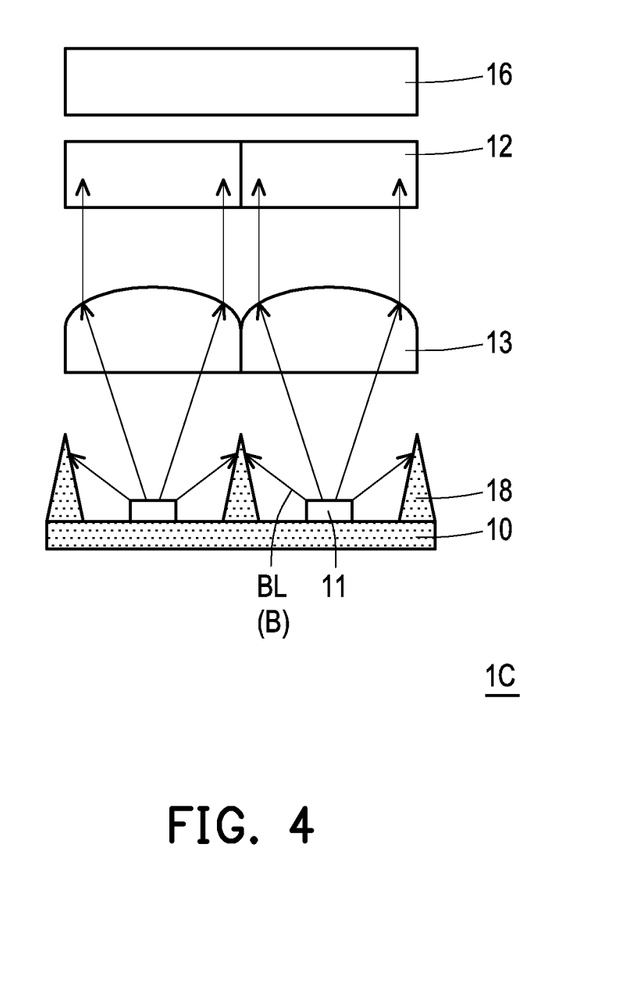

Please refer to FIG. 4. In an electronic device 1C, there is a retaining wall structure 18 between adjacent two of the light emitting elements 11. The material of the retaining wall structure 18 may include a light absorbing material to absorb a large angle light beam BL emitted from the light emitting element 11 and reduce the probability of the large angle light beam BL being transmitted to the micro lens 13 above the adjacent light emitting element 11. Through the configuration of the retaining wall structure 18, the application of local dimming can also be provided.

It should be understood that although the above embodiments are exemplified with the micro lens 13 as a convex lens, the disclosure is not limited thereto. In other embodiments, although not shown, a concave lens may be used as the micro lens 13. For example, the concave lens may be disposed below the light emitting element 11, wherein a concave surface of the concave lens faces the light emitting element 11, a light emitting surface of the light emitting element 11 faces the concave surface of the concave lens, and the substrate 10 is located between the display panel 16 and the light emitting element 11. Under such architecture, the optical switching unit 12 may be disposed between the display panel 16 and the substrate 10; or the optical switching unit 12 may be disposed between the light emitting element 11 and the concave lens. Under the architecture in which the optical switching unit 12 is disposed between the light emitting element 11 and the concave lens, when the optical switching unit 12 is switched to the transparent state, light emitted from the light emitting element 11 sequentially passes through the optical switching unit 12, is collimated by the concave lens, passes through the optical switching unit 12 again, and is transmitted to the display panel 16 (the privacy mode); and when the optical switching unit 12 is switched to the haze state, the light emitted from the light emitting element 11 is scattered by the optical switching unit 12 to form a divergent light and is transmitted to the display panel 16 (the share mode). In other embodiments, although not shown, under the architecture in which the optical switching unit 12 is disposed between the light emitting element 11 and the concave lens, a switchable mirror may be used as the optical switching unit 12. The switchable mirror may be switched between a reflective state and a transparent state. When the switchable mirror is switched to the transparent state, the light emitted from the light emitting element 11 sequentially passes through the switchable mirror, is collimated by the concave lens, passes through the switchable mirror again, and is transmitted to the display panel 16 (the privacy mode); and when the switchable mirror is switched to the reflective state, the light emitted from the light emitting element 11 is reflected by the switchable mirror without passing through the concave lens (so there is no light condensing effect) and is then transmitted to the display panel 16 (the share mode).

Figure 5:
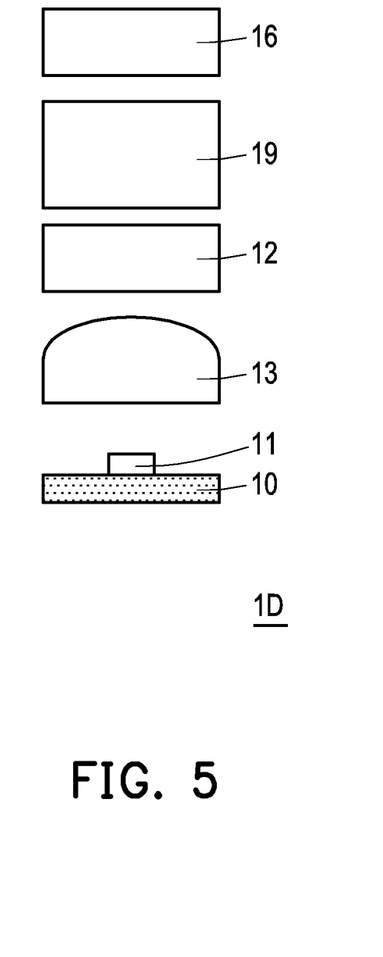

Please refer to FIG. 5. In addition to the substrate 10, the light emitting elements 11 (only one is schematically shown in the drawing), the optical switching unit 12, the micro lenses 13 (only one is schematically shown in the drawing), and the display panel 16, an electronic device 1D may further include an optical film 19 to adjust the light pattern, increase the light intensity, or reduce the visibility of dark fringes between the micro lenses 13. The optical film 19 may be a prism sheet, a lens sheet, etc., but not limited thereto. In some embodiments, the prism sheet may be a small pitch prism sheet. It should be noted that the pitch of the prism sheet may be defined as a distance from a prism vertex to an adjacent prism vertex. For example, the pitch of the small pitch prism sheet may be less than one-fifth of the radius of the micro lens 13, which can reduce the possibility of the viewer seeing fringes of micro lenses or reduce the possibility of excessive deflection of light rays, so that the viewer in both the privacy mode and the share mode can have better optical experience.

Figure 6:
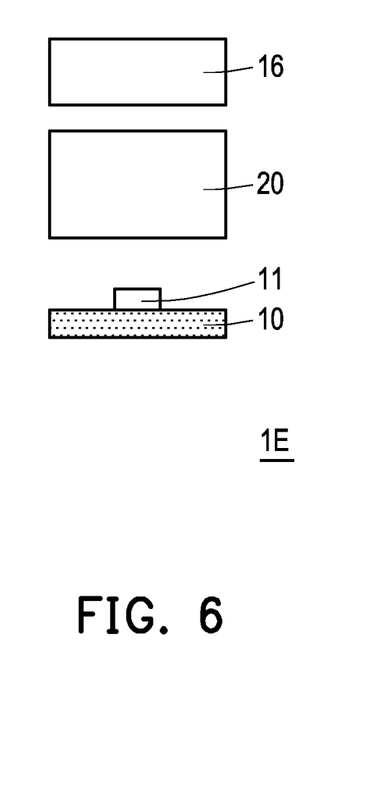

Please refer to FIG. 6. In addition to the substrate 10, the light emitting elements 11 (only one is schematically shown in the drawing), and the display panel 16, an electronic device 1E may further include a switchable lens 20. The switchable lens 20 may be used as an optical switching unit, and the switchable lens 20 may be an electronically controlled lens element, that is, the light condensing effect of the switchable lens 20 may be changed by controlling the voltage. For example, the switchable lens 20 may be a liquid lens or a liquid crystal lens, but not limited thereto.

Figure 7:
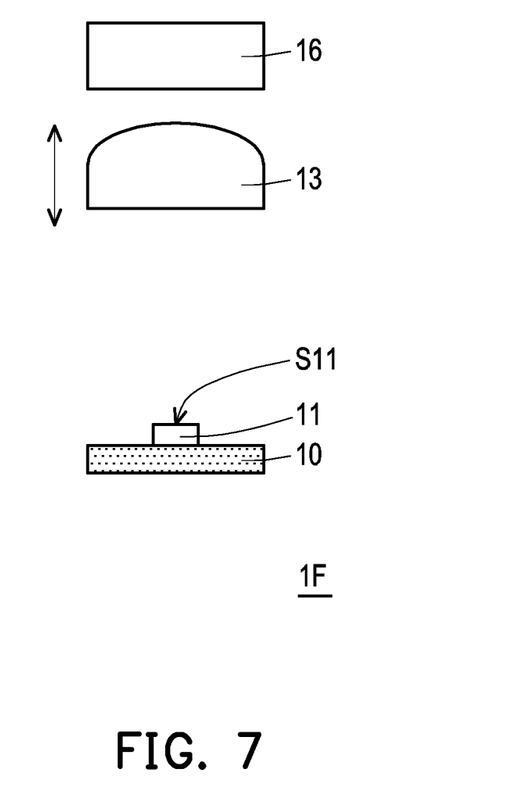

Please refer to FIG. 7. An electronic device 1F may include the substrate 10, the light emitting elements 11 (only one is schematically shown in the drawing), the micro lenses 13 (only one is schematically shown in the drawing), and the display panel 16. The height of the micro lens 13 may be changed through a mechanical member (not shown, such as a motor), thereby changing the distance between the micro lens 13 and the light emitting element 11. For example, when the light emitting surface of the light emitting element 11 is on the focal point of the micro lens 13, the micro lens 13 may collimate the light beam (not shown) from the light emitting element 11, so that the light beam output from the display panel 16 is relatively collimated (the privacy mode). On the other hand, when the light emitting surface of the light emitting element 11 is away from the focal point of the micro lens 13, a more divergent light pattern may be obtained (the share mode).

In other embodiments, although not shown, the height of the substrate 10 may be changed through a mechanical member (not shown, such as a motor), thereby changing the distance between the micro lens 13 and the light emitting element 11.

Figure 8:
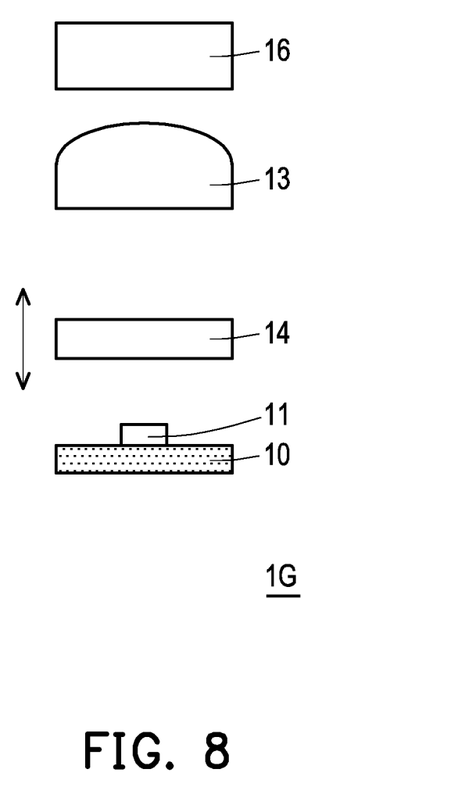

Please refer to FIG. 8. An electronic device 1G may include the substrate 10, the light emitting elements 11 (only one is schematically shown in the drawing), the micro lenses 13 (only one is schematically shown in the drawing), the optical film 14, and the display panel 16. The optical film 14 may be a dual brightness enhancement film, a light wavelength conversion film, or a combination of the above, but not limited thereto. The height of the optical film 14 may be changed through a mechanical member (not shown, such as a motor). When the optical film 14 is close to the light emitting element 11, for the micro lens 13, the same is equivalent to a point light source; and when the optical film 14 is close to the micro lens 13, for the micro lens 13, the same is equivalent to a surface light source.

In some embodiments, although not shown, a switchable half mirror (not shown) may be disposed between the micro lens 13 and the optical film 14. The switchable half mirror may be used as the optical switching unit. The switchable half mirror is, for example, an electronically controlled optical element and may be switched between a transmissive state and a reflective state through, for example, an electronically controlled manner. When the switchable half mirror is switched to the transmissive state, the reflectivity is, for example, 0%, and when the switchable half mirror is switched to the reflective state, the reflectivity is, for example, 50% (that is, the transmittance is 50%). Since the optical film 14 usually has a high reflectivity, a light beam passing through the optical film 14 is transmitted back to the optical film 14 through the switchable half mirror. At this time, the optical film 14 is equivalent to a surface light source and may output a wider light pattern.

Figure 9A:
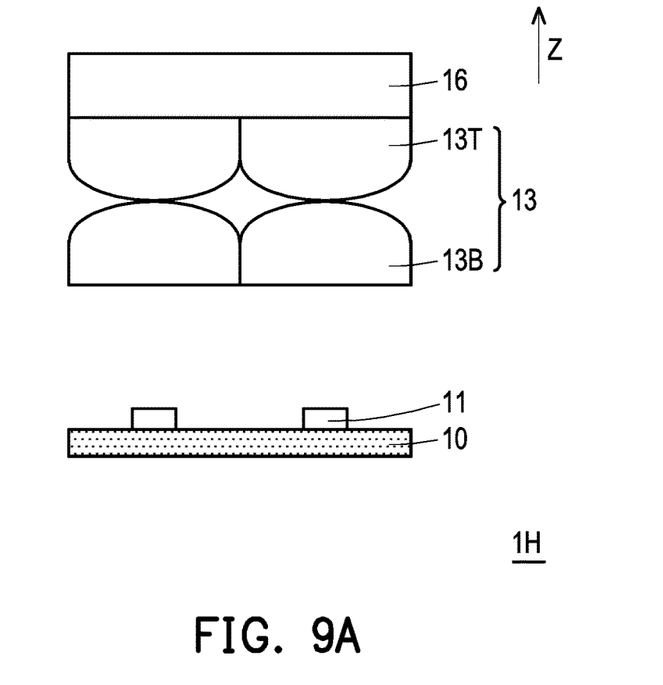
Figure 9B:
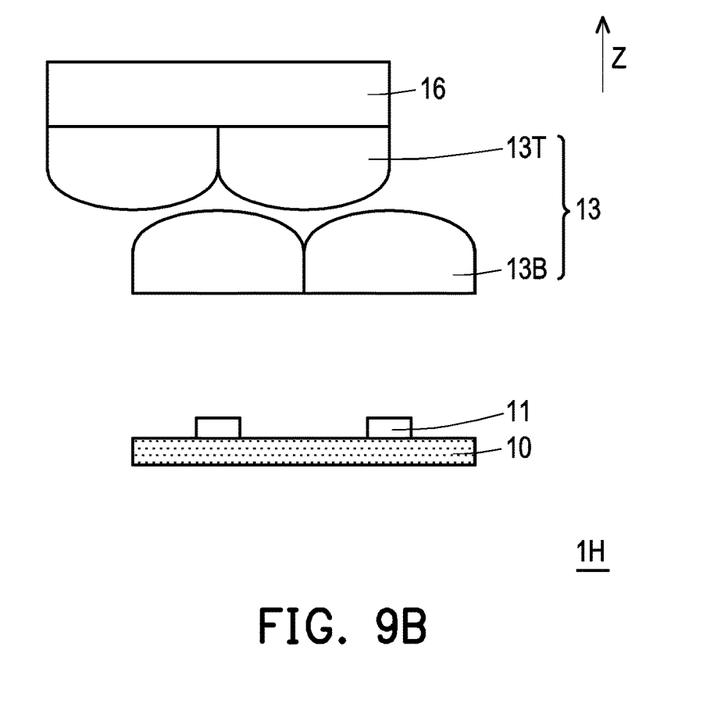

Please refer to FIG. 9A and FIG. 9B. An electronic device 1H may include the substrate 10, the light emitting elements 11, the micro lenses 13, and the display panel 16. Each micro lens 13 is, for example, a bilayer lens and includes an upper layer lens 13T and a lower layer lens 13B, wherein the upper layer lens 13T is disposed between the display panel 16 and the lower layer lens 13B. It should be understood that although the drawing shows that a convex surface of the upper layer lens 13T and a convex surface of the lower layer lens 13B are opposite to each other, the disclosure is not limited thereto.

The display mode, such as the privacy mode and the share mode, of the electronic device 1H may be switched by horizontally moving the upper layer lens 13T relative to the lower layer lens 13B through a mechanical member (not shown, such as a motor). For example, the upper layer lens 13T and the lower layer lens 13B may be aligned in a direction Z through the mechanical member, so as to achieve a relatively collimated light pattern (the privacy mode, as shown in FIG. 9A). On the other hand, the upper layer lens 13T and the lower layer lens 13B may be misaligned in the direction Z through the mechanical member, so as to achieve a relatively divergent light pattern (the share mode, as shown in FIG. 9B).

Figure 13:
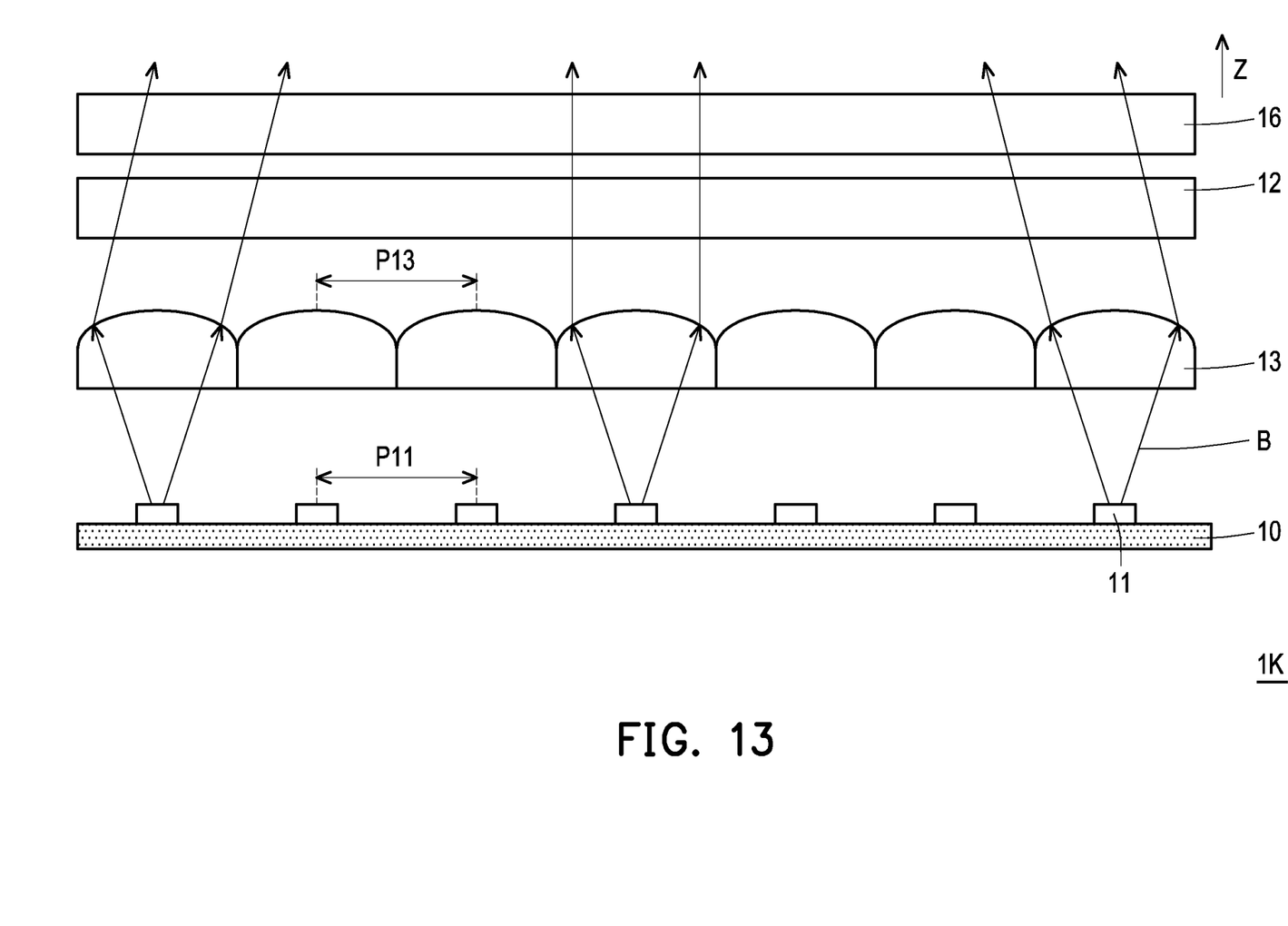
FIG. 13 is a partial cross-sectional schematic view of an electronic device according to an embodiment of the disclosure.

In some embodiments, as shown in FIG. 13, the privacy protection requirement of a large-sized electronic device may be implemented through enabling the pitch of the light emitting elements to be different from the pitch of the micro lenses. FIG. 13 is a partial cross-sectional schematic view of an electronic device according to an embodiment of the disclosure. Please refer to FIG. 13. A pitch P11 of the light emitting elements 11 may be slightly greater than a pitch P13 of the micro lenses 13, and the light emitting element 11 in the middle of an electronic device 1K is aligned with the micro lens 13 in the middle of the electronic device 1K in the direction Z. Under such design, the offset of the light emitting element 11 and the corresponding micro lens 13 increases closer to the edge of the electronic device 1K, thereby achieving the effect of outer light rays being concentrated toward the center. It should be noted that the pitch P11 of the light emitting elements 11 may be defined as a distance from the center of the light emitting element 11 to the center of the light emitting element 11, and the pitch P13 of the micro lenses 13 may be defined as a distance from the vertex of the micro lens 13 to the vertex of the micro lens 13.

Figure 10:
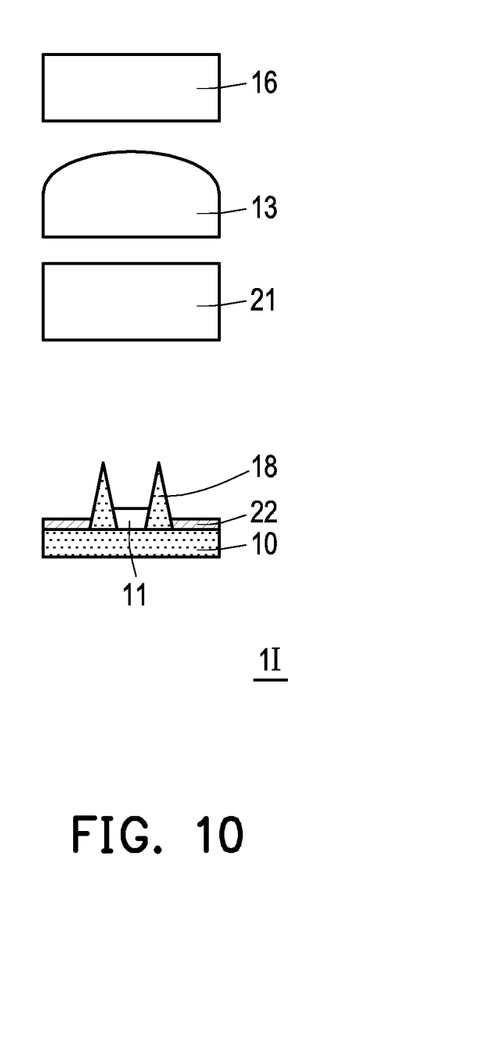

Please refer to FIG. 10. In addition to the substrate 10, the light emitting elements 11 (only one is schematically shown in the drawing), the micro lenses 13 (only one is schematically shown in the drawing), the display panel 16, and the retaining wall structure 18, an electronic device 1I may further include a switchable half mirror 21 and a reflective layer 22. In the embodiment, the switchable half mirror may be used as the optical switching unit, but not limited thereto.

The switchable half mirror 21 is, for example, disposed between the micro lens 13 and the optical film 14, and the reflective layer 22 (formed by, for example, metal, reflective paint, or reflective adhesive) is disposed on the substrate and is located in a region other than the light emitting elements 11 and the retaining wall structure 18. The switchable half mirror 21 may reflect a light beam from the light emitting element 11, and the light beam reflected by the switchable half mirror 21 may be reflected via the reflective layer 22 and transmitted upward again. At this time, the switchable half mirror 21 is equivalent to a surface light source and may output a wider light pattern. In addition, through the configuration of the retaining wall structure 18, the probability of the large angle light beam emitted from the light emitting element 11 being directly incident to the reflective layer 22 can be reduced.

Figure 11:
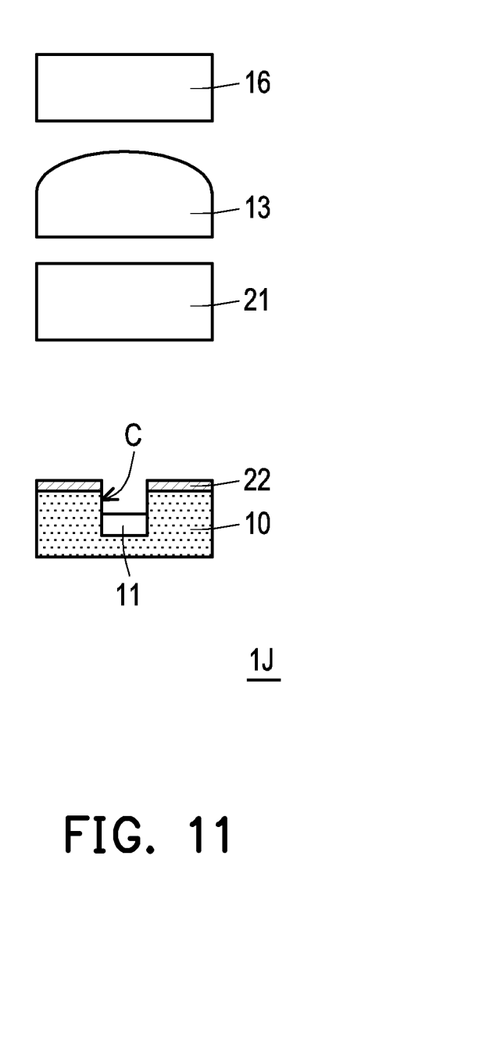

Please refer to FIG. 11. In an electronic device 1J, the substrate 10 has a depression C, wherein light emitting element 11 is disposed in the depression C and a light emitting surface (for example, a top surface) of the light emitting element 11 is lower than the reflective layer 22, thereby reducing the probability of the large angle light beam emitted from the light emitting element 11 being directly incident to the reflective layer 22. Through the design of the depression C, the retaining wall structure 18 in FIG. 10 may be omitted.

Figure 12A:
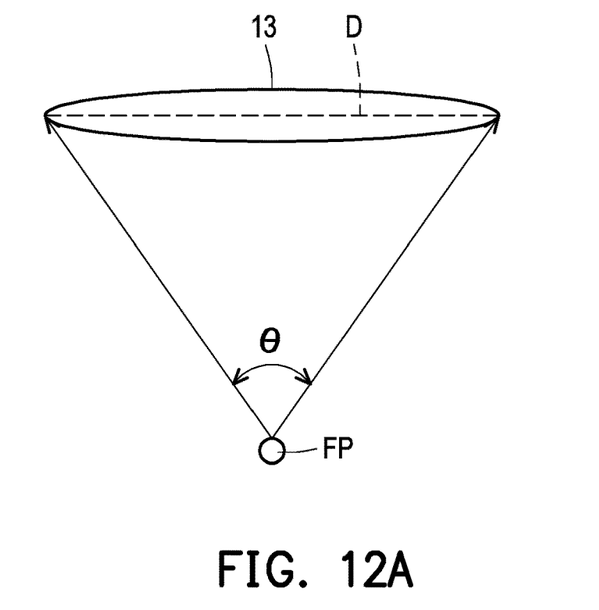
FIG. 12A shows a positive focal field of view (FOV) of a micro lens.
Figure 12B:
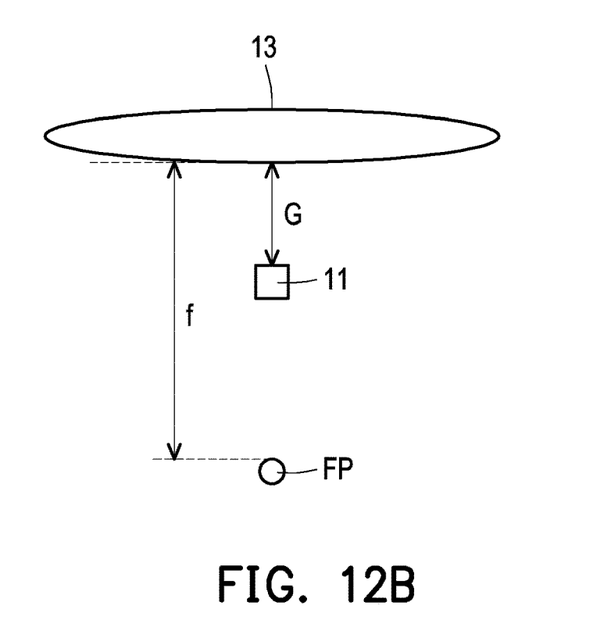
FIG. 12B shows a spacing between a light emitting element and a micro lens and a focal length of the micro lens.

FIG. 12A shows a positive focal field of view of a micro lens. FIG. 12B shows a spacing between a light emitting element and a micro lens and a focal length of the micro lens. Please refer to FIG. 12A and FIG. 12B. The micro lens 13 has a positive focal field of view $\theta$. The positive focal field of view $\theta$ refers to an included angle between the focal point FP of the micro lens 13 and a diameter D of the micro lens 13. The spacing between the light emitting element 11 and the micro lens 13 is G, and the focal length of the micro lens 13 is f. The greater the positive focal field of view $\theta$, the lower the probability of the light beam emitted by the light emitting element 11 being incident to the micro lens 13 above the adjacent light emitting element 11. The smaller the positive focal field of view $\theta$, the greater the probability of the light beam emitted by the light emitting element 11 being incident to the micro lens 13 above the adjacent light emitting element 11. In addition, the closer G/f is to 1, the more collimated the output light is, but the probability of the light beam emitted by the light emitting element 11 being incident to the micro lens 13 above the adjacent light emitting element 11 is higher. The smaller the G/f, the less collimated the output light, but the probability of the light beam emitted by the light emitting element 11 being incident to the micro lens 13 above the adjacent light emitting element 11 is lower. In some embodiments, when the electronic device is in the privacy mode, $0.4 \leq G/f \leq 1$, and when the electronic device is in the share mode, $G/f \leq 0.3$ or $G/f \geq 1.5$.

In some embodiments, there may be a first gap G1 between the display panel 16 and the micro lenses 13 (see FIG. 2 and FIG. 3). The first gap G1 may be an air gap. For example, there is no other element between the display panel 16 and the micro lens 13, so as to achieve the concealing effect.

In some embodiments, there may be a second gap G2 between the light emitting units 11 and the micro lenses 13 (see FIG. 2 and FIG. 3). The second gap G2 may be an air gap. For example, there is no other element between the light emitting units 11 and the micro lenses 13, so as to adjust the optical design of G/f according to different modes, which is beneficial to controlling the optical effect.

In summary, in the embodiments of the disclosure, the optical switching unit may be switched between the transparent state and the haze state, so that the electronic device may be switched between the share mode and the privacy mode. Therefore, the electronic device of the embodiments of the disclosure is an electronic device that can switch the display mode according to different usage conditions.

The above embodiments are only used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

Although the embodiments of the disclosure and the advantages thereof have been disclosed above, it should be understood that any person skilled in the art can make changes, substitutions, and modifications without departing from the spirit and scope of the disclosure, and the features of the embodiments can be arbitrarily mixed and replaced to form other new embodiments. In addition, the protection scope of the disclosure is not limited to the process, machine, manufacture, material composition, device, method, and steps in the specific embodiments described in the specification. Any person skilled in the art can understand conventional or future-developed processes, machines, manufactures, material compositions, devices, methods, and steps from the content of the disclosure as long as the same can implement substantially the same functions or achieve substantially the same results in the embodiments described herein. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. An electronic device, comprising:
    a substrate;
    a plurality of light emitting elements, disposed on the substrate;
    an optical switching unit, disposed on the light emitting elements; and
    a plurality of micro lenses, disposed on the light emitting elements and overlapping with the optical switching unit,
    wherein at least one of the light emitting elements is disposed corresponding to one of the micro lenses,
    wherein a spacing between the at least one of the light emitting elements and the one of the micro lenses is G, and a focal length of the one of the micro lenses is f, wherein:
    when the electronic device is in a privacy mode, $0.4 \leq G/f \leq 1$, and
    when the electronic device is in a share mode, $G/f \leq 0.3$ or $G/f \geq 1.5$.

2. The electronic device according to claim 1, wherein the optical switching unit is between the light emitting elements and the micro lenses.

3. The electronic device according to claim 1, wherein the micro lenses are between the optical switching unit and the light emitting elements.

4. The electronic device according to claim 1, wherein the optical switching unit comprises two substrates and a liquid crystal layer disposed between the two substrates.

5. The electronic device according to claim 4, wherein the optical switching unit further comprises a light transmitting conductive layer, wherein the light transmitting conductive layer is disposed on one of the two substrates.

6. The electronic device according to claim 4, wherein the liquid crystal layer comprises polymer dispersed liquid crystal, polymer network liquid crystal, or polymer stabilized cholesteric texture.

7. The electronic device according to claim 1, further comprising:
    a retaining wall structure, disposed between adjacent two of the light emitting elements.

8. The electronic device according to claim 1, further comprising:
    a display panel, disposed above the optical switching unit.

9. The electronic device according to claim 8, wherein there is a first gap between the display panel and the micro lenses.

10. The electronic device according to claim 9, wherein the first gap is an air gap.

11. The electronic device according to claim 8, further comprising:
    an optical film, disposed between the light emitting elements and the display panel.

12. The electronic device according to claim 11, wherein the optical film is disposed between the micro lenses and the light emitting elements, and the optical switching unit is disposed between the micro lenses and the display panel.

13. The electronic device according to claim 11, wherein the optical film is disposed between the micro lenses and the light emitting elements, and the optical switching unit is disposed between the micro lenses and the optical film.

14. The electronic device according to claim 11, wherein the optical film is disposed between the optical switching unit and the display panel, and the micro lenses are disposed between the optical switching unit and the light emitting elements.

15. The electronic device according to claim 11, wherein the optical film is disposed between the optical switching unit and the light emitting elements, and the micro lenses are disposed between the optical switching unit and the display panel.

16. The electronic device according to claim 15, wherein the optical switching unit is a switchable half mirror.

17. The electronic device according to claim 1, wherein there is a second gap between the light emitting units and the micro lenses.

18. The electronic device according to claim 17, wherein the second gap is an air gap.

19. The electronic device according to claim 1, wherein the substrate has a plurality of depressions, and the light emitting units are respectively disposed in the depressions, the electronic device further comprising:
    a reflective layer, disposed on the substrate, wherein light emitting surfaces of the light emitting units are lower than the reflective layer.

* * * * *